(12) United States Patent
Li et al.

(10) Patent No.: US 12,498,957 B2
(45) Date of Patent: Dec. 16, 2025

(54) DATA PROCESSING METHOD AND APPARATUS, AND READABLE MEDIUM AND COMPUTING DEVICE

(71) Applicant: Beijing Youzhuju Network Technology Co., Ltd., Beijing (CN)

(72) Inventors: Hangjing Li, Beijing (CN); Liang Deng, Beijing (CN); Yongji Xie, Beijing (CN); Wen Chai, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/886,790

(22) Filed: Sep. 16, 2024

(65) Prior Publication Data
US 2025/0004819 A1   Jan. 2, 2025

Related U.S. Application Data

(63) Continuation of application No. PCT/CN2023/081161, filed on Mar. 13, 2023.

(30) Foreign Application Priority Data

Mar. 17, 2022 (CN) .......................... 202210265459.9

(51) Int. Cl.
*G06F 9/455* (2018.01)
*G06F 9/54* (2006.01)

(52) U.S. Cl.
CPC .......... *G06F 9/45558* (2013.01); *G06F 9/544* (2013.01); *G06F 2009/45575* (2013.01);
(Continued)

(58) Field of Classification Search
CPC ................. G06F 9/45558; G06F 9/544; G06F 2009/45575; G06F 2009/45583;
(Continued)

(56) References Cited

U.S. PATENT DOCUMENTS

2008/0294808 A1*  11/2008  Mahalingam ........... G06F 13/24
                                                                710/26
2009/0119087 A1    5/2009  Ang et al.
(Continued)

FOREIGN PATENT DOCUMENTS

CN         106462451 A       2/2017
CN         108196945 A       6/2018
(Continued)

OTHER PUBLICATIONS

International Search Report for PCT Patent Application No. PCT/CN2023/081161, mailed May 23, 2023, 5 pages.
(Continued)

*Primary Examiner* — Kenneth Tang
(74) *Attorney, Agent, or Firm* — Astute IP Law Group

(57) ABSTRACT

The disclosure relates to a data processing method, apparatus, readable medium, computing device, computer program product, and computer program. The method is implemented at a computing device. A virtual machine is executed in the computing device. The method includes: in response to a target virtual device receiving a data read/write request, writing, into a shared memory, target data comprised in the data read/write request, the target virtual device being a virtual device in the virtual machine; sending an interrupt instruction to a target physical processor in the computing device through a pass-through register corresponding to the target virtual device, the interrupt instruction being used by the target physical processor to acquire the target data from the shared memory according to the interrupt instruction,
(Continued)

and inform, based on the target data, a corresponding back-end service program to process the data read/write request.

17 Claims, 2 Drawing Sheets

(52) U.S. Cl.
CPC .............. *G06F 2009/45583* (2013.01); *G06F 2209/543* (2013.01)

(58) Field of Classification Search
CPC ...... G06F 2209/543; G06F 9/54; G06F 13/16; G06F 13/42; G06F 9/45529
See application file for complete search history.

(56) References Cited

U.S. PATENT DOCUMENTS

| | | | | |
|---|---|---|---|---|
| 2009/0287886 A1* | 11/2009 | Karstens | ............. | G06F 9/44557 718/1 |
| 2012/0167082 A1* | 6/2012 | Kumar | ................ | G06F 9/45558 718/1 |
| 2015/0163248 A1* | 6/2015 | Epstein | .................. | G06F 21/53 726/1 |
| 2018/0321879 A1* | 11/2018 | Lu | .............................. | G06F 3/06 |
| 2021/0089471 A1* | 3/2021 | Lu | .......................... | G06F 3/0665 |
| 2021/0096901 A1* | 4/2021 | Xia | ......................... | G06F 9/327 |
| 2022/0365729 A1* | 11/2022 | Cao | ........................ | G06F 9/4812 |
| 2022/0365802 A1* | 11/2022 | Neiger | ................... | G06F 9/4812 |
| 2023/0418640 A1* | 12/2023 | Nair | ........................ | G06F 3/061 |
| 2024/0192981 A1* | 6/2024 | Wang | .................... | G06F 9/45558 |

FOREIGN PATENT DOCUMENTS

| | | |
|---|---|---|
| CN | 108369604 A | 8/2018 |
| CN | 112463307 A | 3/2021 |
| CN | 113110916 A | 7/2021 |
| CN | 113778611 A | 12/2021 |
| CN | 113867993 A | 12/2021 |
| CN | 114625480 A | 6/2022 |
| WO | 2022002106 A1 | 1/2022 |

OTHER PUBLICATIONS

Office Action for Chinese Patent Application No. 202210265459.9, mailed on Sep. 30, 2024, 14 pages.

Dong et al., "Towards High-Quality I/O Virtualization", Systor'09, ACM, 2 Penn Plaza, Suite 701, New York, NY 10121-0701 USA, May 4, 2009, 26 pages.

Extended European Search Report for European Patent Application No. 23769722.2, mailed on Mar. 13, 2025, 8 pages.

* cited by examiner

DATA PROCESSING METHOD AND APPARATUS, AND READABLE MEDIUM AND COMPUTING DEVICE

CROSS REFERENCE TO RELATED APPLICATIONS

This application is a continuation of International Patent Application No. PCT/CN2023/081161, filed on Mar. 13, 2023, which claims priority to Chinese Patent Application No. 202210265459.9, filed Mar. 17, 2022, and entitled "DATA PROCESSING METHOD AND APPARATUS, AND READABLE MEDIUM AND COMPUTING DEVICE", both of which are incorporated herein by reference in its entirety.

FIELD

The present disclosure relates to the field of virtual machine technologies, and in particular, to a data processing method, apparatus, readable medium, computing device, computer program product, and computer program.

BACKGROUND

In the current background of virtualization technology, a data read/write device (such as a network adapter/disk) of a virtual machine is mostly a half-virtual device implemented based on a virtio protocol, and such a device may be referred to as a virtio device or a virtual device for short. A virtual device generally notifies a corresponding back-end service program to process a data read/write request, and in the process, a plurality of VM Exits are generally generated, thereby affecting performance of the virtual device.

SUMMARY

This Summary is provided to introduce the concepts in a simplified form that are further described below in the Detailed Description. The Summary section is not intended to identify key features or essential features of the claimed subject matter, nor is it intended to be used to limit the scope of the claimed subject matter.

In a first aspect, the present disclosure provides a data processing method implemented at a computing device, a virtual machine being executed in the computing device. The method comprises:
  in response to a target virtual device receiving a data read/write request, writing, into a shared memory, target data comprised in the data read/write request, the target virtual device being a virtual device in the virtual machine;
  sending an interrupt instruction to a target physical processor in the computing device through a pass-through register corresponding to the target virtual device, the interrupt instruction being used by the target physical processor to acquire the target data from the shared memory according to the interrupt instruction, and inform, based on the target data, a corresponding back-end service program to process the data read/write request.

In a second aspect, the present disclosure provides a data processing apparatus implemented at a computing device, a virtual machine is executed at the computing device. The data processing apparatus comprises:
  a write module configured to, in response to a target virtual device receiving a data read/write request, write, into a shared memory, target data comprised in the data read/write request, the target virtual device being a virtual device in the virtual machine;
  a sending module configured to send an interrupt instruction to a target physical processor in the computing device through a pass-through register corresponding to the target virtual device, the interrupt instruction being used by the target physical processor to acquire the target data from the shared memory according to the interrupt instruction, and inform, according to the target data, a corresponding back-end service program to process the data read/write request.

In a third aspect, the present disclosure provides a computer readable storage medium having a computer program stored thereon. The computer program is executed by at least one physical processor to run a virtual machine and enable the virtual machine to implement steps of the method according to the first aspect.

In a fourth aspect, the present disclosure provides a computing device. The computing device comprises:
  a memory having at least one computer program stored thereon;
  at least one physical processor configured to execute the at least one computer program in the memory to run a virtual machine and enable the virtual machine to implement steps of the method according to the first aspect.

In a fifth aspect, the present disclosure provides a computer program product. The computer program product has program code stored thereon, instructions comprised in the program codes, when executed by at least one physical processor to run a virtual machine, and enable the virtual machine to implementing steps of the method according to the first aspect.

In a sixth aspect, the disclosure provides a computer program. The computer program is executed by at least one physical processor to run a virtual machine and enable the virtual machine to implement steps of the method according to the first aspect.

Additional features and advantages of the disclosure will be set forth in the following detailed description.

BRIEF DESCRIPTION OF THE DRAWINGS

The above and other features, advantages, and aspects of various embodiments of the present disclosure will become more apparent with reference to the following detailed description taken in conjunction with the accompanying drawings. The same or like reference numerals represent the same or like elements throughout the drawings, it being understood that the drawings are illustrative and that the elements and primaries are not necessarily drawn to scale. In the drawings.

DETAILED DESCRIPTION

Figure 1:
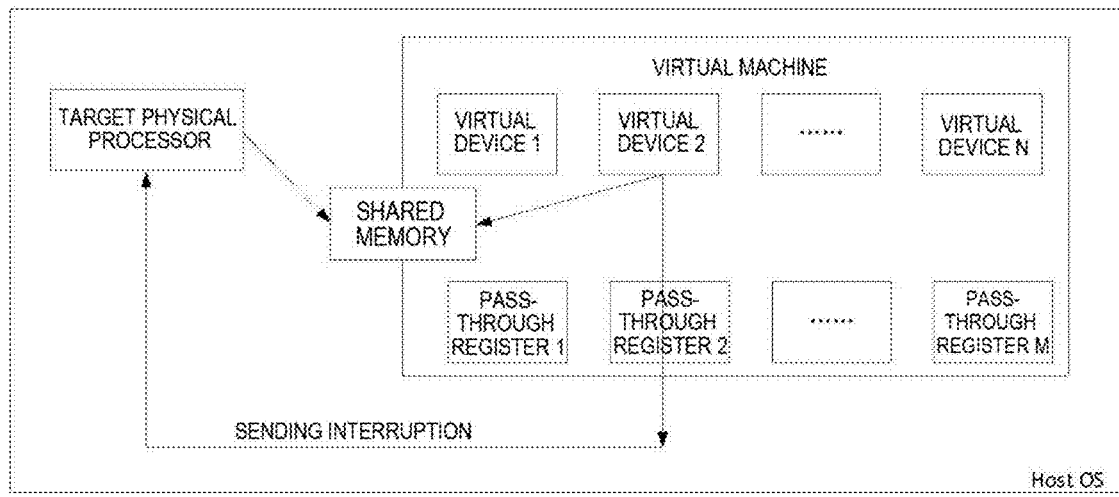
FIG. 1 is an architecture diagram of a computing device provided according to an example embodiment.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein, but rather these embodiments are provided for a thorough and complete understanding of the present disclosure. It should be understood that the drawings and embodiments of the present disclosure are only for illustrative purposes and are not intended to limit the scope of the present disclosure.

It should be understood that the steps recorded in the method embodiments of the present disclosure may be executed in different orders, and/or executed in parallel. Furthermore, method embodiments may include additional steps and/or omit the steps illustrated performing. The scope of the present disclosure is not limited in this respect.

The term "comprising" and variations thereof, as used herein, is inclusive, i.e., "including but not limited to". The term "based on" is "based at least in part on". The term "one embodiment" means "at least one embodiment"; the term "another embodiment" means "at least one further embodiment"; the term "some embodiments" means "at least some embodiments". Relevant definitions of other terms will be given in the following description.

It should be noted that, the "first', "second", and other concepts mentioned in the present disclosure are only used to distinguish different apparatuses, modules, or units, but are not used to limit the sequence or dependency of functions performed by these apparatuses, modules, or units.

It should be noted that the modifications of "a" and "a plurality" mentioned in the present disclosure are illustrative rather than restrictive, and those skilled in the art should understand that they should be understood as "one or more" unless the context clearly indicates otherwise.

The names of messages or information interacted between a plurality of devices in the embodiments of the present disclosure are only for illustrative purposes, and are not intended to limit the scope of these messages or information.

In the related art, after a virtual device receives a data read/write request, a Virtqueue of the virtual device notifies a back-end service program by a Kick function, the Kick function writing a register of a device configuration space. In order to complete the processing of the data read/write request, however, the Kick function writing a register of a device configuration space may exit from a client mode to a host mode many times, which results in a plurality of VM Exits, thereby increasing a delay in processing a data read/write request, and further affecting performance of the virtual device. The data read/write request may also be referred to as an I/O (Input/Output) request.

In view of the above technical problems, embodiments of the present disclosure provide a data processing method, apparatus, readable medium, computing device, computer program product and computer program. In response to receiving a data read/write request, a target virtual device first write, into a shared memory, target data comprised in the data read/write request, the target virtual device being a virtual device in the virtual machine; then sends an interrupt instruction to a target physical processor in the computing device through a pass-through register corresponding to the target virtual device, to enable the target physical processor to acquire the target data from the shared memory according to the interrupt instruction, and informs, based on the target data, a corresponding back-end service program to process the data read/write request. The original manner of the virtual device writing the device configuration space is changed to sending an interrupt to the physical processor, so that the virtual machine does not need to exit the host mode when performing a inform, thereby reducing the VM Exit generated in the process of the virtual device writing the device configuration space, reducing a delay of processing a data read/write request, and improving the processing performance of the virtual device.

To facilitate detailed description of the solutions of the present application, the following first introduces an architecture schematic diagram of a computing device in an embodiment of the present application with reference to the accompanying drawings.

In some embodiments, reference is made to FIG. 1, which illustrates a schematic architecture diagram of a computing device provided according to an embodiment of the present disclosure. A host operating system (Host OS) is executed in the computing device, and a virtual machine is executed in the host operating system. The virtual machine includes a plurality of virtual devices (a virtual device 1, a virtual device 2, . . . , and a virtual device N). The computing device includes at least one physical processor. The computing device also applies for a shared memory capable that both the physical processor and the virtual machine can operate. In addition, the virtual machine further includes a virtual processor (not shown), and each virtual processor corresponds to a pass-through register, respectively. The virtual device can send the interrupt to the corresponding physical processor through the corresponding pass-through register.

The following describes in detail a data processing method, apparatus, readable medium, computing device, computer program product, and computer program provided in embodiments of the present disclosure with reference to the accompanying drawings.

Figure 2:
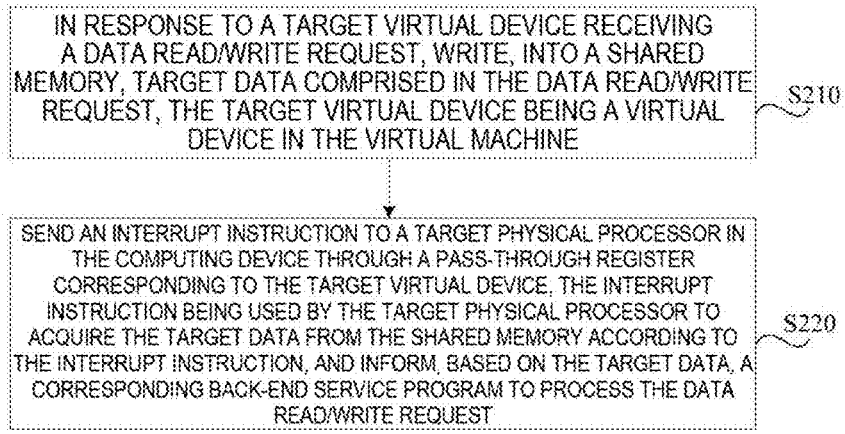
FIG. 2 is a schematic flowchart of a data processing method provided according to an example embodiment.

FIG. 2 is a schematic flowchart of a data processing method provided according to an example embodiment. The data processing method provided in an embodiment of the present disclosure may be executed by a computing device, and may specifically be executed by a data processing device. The device may be implemented by software and/or hardware and is configured in the computing device. A virtual machine is executed in the computing device. Referring to FIG. 2, the data processing method according to an embodiment of the present disclosure may include the following steps.

S210: in response to a target virtual device receiving a data read/write request, writing, into a shared memory, target data comprised in the data read/write request, the target virtual device being a virtual device in the virtual machine.

The virtual device in the virtual machine may be, for example, a virtual network adapter device, a virtual block device, and so on, where the number of each virtual device may be more than one. For example, in some implementations, the virtual device in the virtual machine may include a virtual network adapter device 1, a virtual network adapter device 2, a block device 1, a block device 2, and so on.

It can be understood that application programs may be installed on a virtual machine, and various data read/write requests may be generated in executing processes of the application programs, for example, a request for reading/writing a block device, a request for sending or receiving a data packet by using a network adapter device, and the like.

Then, a data read/write request for a certain virtual device is received by the corresponding virtual device, and accordingly, the corresponding virtual device is the target virtual device.

For example, an application program in the virtual machine generates a request for reading data of the block device 1, and in this case, the block device 1 is the target virtual device.

It can be understood that, in order to implement a data read/write task, each data read/write request includes data of a plurality of fields, and data of some specific fields in the data read/write request needs to be acquired by a subsequent target physical processor; therefore, the data of the specific fields may be understood as target data.

In some embodiments, in order to enable a target physical processor to accurately inform a corresponding back-end service program, the target data may include a read/write address, an address length, and device queue information.

In some embodiments, after the virtual machine is started, an address of the shared memory may be acquired by reading an MSR (Model-Specific Register), and the address is mapped to a middle of a kernel address of the virtual machine, so that the virtual device may access the shared memory.

Step S220: sending an interrupt instruction to a target physical processor in the computing device through a pass-through register corresponding to the target virtual device, the interrupt instruction being used by the target physical processor to acquire the target data from the shared memory according to the interrupt instruction, and inform, based on the target data, a corresponding back-end service program to process the data read/write request.

It can be seen in combination with FIG. 1 and the relevant description thereof that a virtual machine may comprise a plurality of virtual processors, and each virtual processor may correspond to one pass-through register. In this case, different application programs may be executed on different virtual processors, and therefore, the pass-through register corresponding to the target virtual device may be understood as the pass-through register of the virtual processor executing the corresponding application program that generates the data read/write request.

Exemplarily, an application program 1 in a virtual machine generates a request for reading data of a block device 1, the application program 1 is executed on a virtual processor 2, and a pass-through register corresponding to the virtual processor 2 is a pass-through register 2, and at this time, the block device 1 may operate the pass-through register 2 to send an interrupt instruction to a target physical processor in the computing device.

The target physical processor is a predetermined physical processor for receiving an interrupt instruction sent through the pass-through register. It may be any one of a plurality of physical processors in the computing device, and may be preassigned during virtual machine creation as required. Then, the interrupt instruction of pass-through register operated by the virtual device is received by the target physical processor.

In some embodiments, after receiving the interrupt instruction, the target physical processor may process the interrupt instruction by itself, that is, the target physical processor may read the target data from the shared memory according to the interrupt instruction, and further inform a corresponding back-end service program to process the data read/write request according to the target data.

After receiving the data read/write request, the target virtual device may be stored in the virtual device hash table (scatterlist), and then the virtqueue of the target virtual device may provide add_buf to map data in the hash table to a front-end and back-end data shared area Vring, so that after receiving the informing, the back-end service program may acquire the data read/write request from the front-end and back-end shared area Fring, and perform processing.

In other implementations, after receiving the interrupt instruction, the target physical processor may not only execute the interrupt instruction by itself, but also send the interrupt instruction to another physical processor for execution, which is determined according to a current actual working load of each physical processor.

By using the above method, in response to receiving a data read/write request, a target virtual device first write, into a shared memory, target data comprised in the data read/write request, the target virtual device being a virtual device in the virtual machine; then sends an interrupt instruction to a target physical processor in the computing device through a pass-through register corresponding to the target virtual device, to enable the target physical processor to acquire the target data from the shared memory according to the interrupt instruction, and informs, based on the target data, a corresponding back-end service program to process the data read/write request. The original manner of the virtual device writing the device configuration space is changed to sending an interrupt to the physical processor, so that the virtual machine does not need to exit the host mode when performing a inform, thereby reducing the VM Exit generated in the process of the virtual device writing the device configuration space, reducing a delay of processing a data read/write request, and improving the processing performance of the virtual device.

In some embodiments, the virtual machine may be created as follows.

In a creation process of a virtual machine, configuration of a local advanced programmable interrupt controller (LAPIC) is changed to x2apic. When a virtual machine enters a Non-root Mode, a VMCS (Virtual Machine Control Structure) is configured, and an interrupt command register (ICR) of a local advanced programmable interrupt controller is configured to a pass-through mode, so that an inter-core interrupt can be sent to a physical CPU directly by operating the interrupt command register in the virtual machine. For normal IPI (Interrupt-Procctor Interrupt) interruption of the virtual machine, the interruption is implemented through a half-virtual PV_IPI (Para-Virtualization_IPI).

Thus, in some implementation, the pass-through register is obtained by configuring the interrupt command register of the local advanced programmable interrupt controller to the pass-through mode during the creation of the virtual machine. At this point, the pass-through register may be a pass-through interrupt command register.

In some embodiments, the shared memory comprises a physical processor identifier. In this case, the method of the embodiments of the present disclosure may further comprise the following steps:

acquiring the physical processor identifier from the shared memory determining the target physical processor based on the physical processor identifier.

In the embodiments of the present disclosure, by setting a target physical processor identifier, a target virtual device may accurately determine a target physical processor, and send an interrupt instruction to the target virtual device. Consider that the target virtual device has a process of accessing the shared memory after receiving the data read/write request, the target physical processor identifier may further be stored in the shared memory, thereby reducing access of the target virtual device among a plurality of memory areas.

Figure 3:
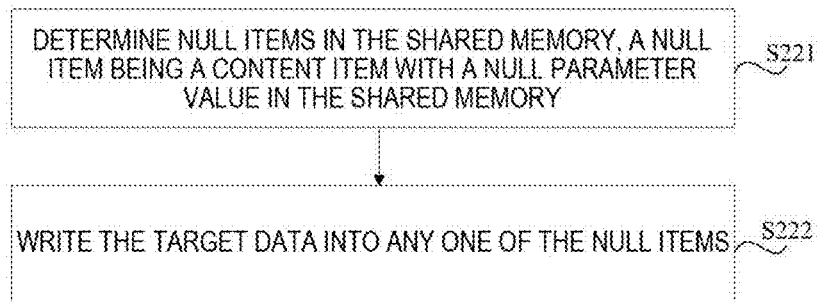
FIG. 3 is a schematic flowchart of a specific implementation of step S210 provided according to an example embodiment.

In some embodiments, the shared memory comprises a content item for recording the target data. In this case, as shown in FIG. 3, writing, into the shared memory, target data comprised in the data read/write request comprises the following steps.

S221: determining null items in the shared memory, a null item being a content item with a null parameter value in the shared memory.

S222, writing the target data into any one of the null items.

In the embodiments of the present disclosure, the shared memory may include a plurality of content items for recording parameter values, which are used for storing respective target data. When a certain content item does not record the target data, that is, when the parameter value is null, the content item is a null item. Thus, when receiving the data read/write request, the target virtual device may write the target data included in the data read/write request into any null entry in the shared memory.

It can be seen in combination with the described contents that, in some embodiments, the target data comprises a read/write address, an address length and device queue information, and in this case, each content item may record three parameters of the read/write address, the address length and the device queue information in an array.

Figure 4:
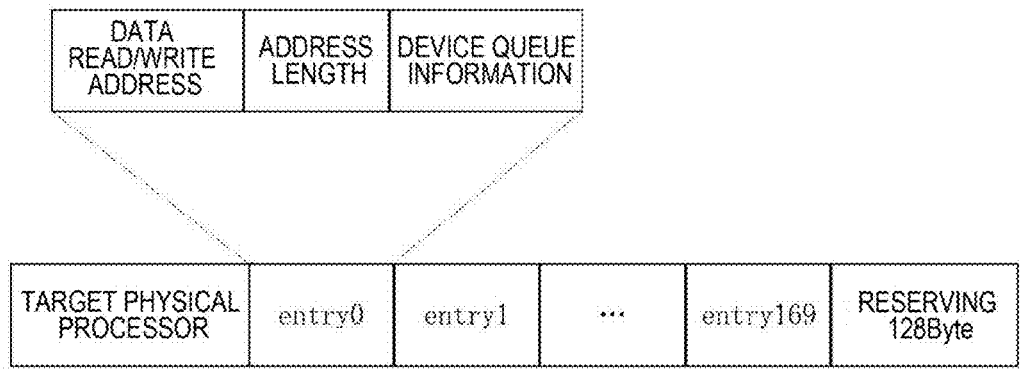
FIG. 4 is a schematic diagram of a data structure of data in a shared memory provided according to an example embodiment.

With reference to FIG. 4, FIG. 4 illustrates a schematic diagram of a data structure of data in a shared memory according to the foregoing embodiments. The shared memory comprises a target physical processor identifier and 170 content items for recording target data, and a reserved 128 Byte of space, where 170 content items for recording the target data are, for example, entry0, entry1, . . . , entry 169 in FIG. 4. Each content item is used to record a read/write address, an address length, and device queue information.

In some embodiments, the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

In a creation process of a virtual machine, an API (Application Programming Interface) may be invoked in advance to collect parameters of target data corresponding to a physical device, that is, parameters of target data corresponding to a PCI (Peripheral Component Interconnect) device, so as to form a predetermined index table, where each item in the index table includes the target data, and each item in the index table may correspond to one physical device, where the physical device corresponds to a back-end service program.

Thus, in the embodiments of the present disclosure, after receiving the interrupt instruction sent by the pass-through register, the target physical processor may acquire the target data from the shared memory according to the interrupt instruction, and then search the predetermined index table for the item matching the target data, thereby determining the corresponding target physical device, and further inform, based on the target data, a corresponding back-end service program to process the data read/write request.

That is to say, after receiving the interrupt instruction, the target physical processor traverses the content item in the shared memory. Each non-null content item may match and find a target device according to bus_idx (idx being FAST_MMIO (Memory Mping I/O), MMIO and PIO (Port I/O) in sequence). The callback function of the target device is then executed, writing a number 1 in the callback function to the eventfd in the device structure. In this way, the service program in the user space may receive a notification, thereby completing the process of inform, based on the target data, a corresponding back-end service program to process the data read/write request.

It should be noted that, considering that the processing of the interrupt instruction by the target physical processor may not be completed instantaneously, or, at the same moment, there may be many data read/write requests, and in this case, it may be possible that not only one null item in the shared memory is written into the content. In this case, the target physical processor obtains, according to the interrupt instruction, target data from the shared memory, where the target data may be target data corresponding to a plurality of content items, respectively. In this case, a plurality of target physical devices may be determined simultaneously, and at the same time, a back-end service program corresponding to the plurality of target physical devices may be informed to process the data read/write request. That is to say, in a process of executing an interrupt instruction, target data in all non-null values in the shared memory is read.

In some embodiments, considering that after the data read/write request is processed, the target data in the shared memory is no longer used. In this case, in order to avoid repeated application for the shared memory, that is, in order to enable the shared memory region to be reused, the interrupt instruction is further used by the target physical processor to delete the target data from the shared memory according to the interrupt instruction after processing the data read/write request.

In the embodiments of the present disclosure, after the target physical processor processes the data read/write request according to the interrupt instruction, the target data is deleted from the shared memory, so that each entry in the shared memory is null, so as to facilitate repeated use of the shared memory, so that when a subsequent target virtual device receives a data read/write request, the target data included in the data read/write request may be written into the shared memory again.

Figure 5:
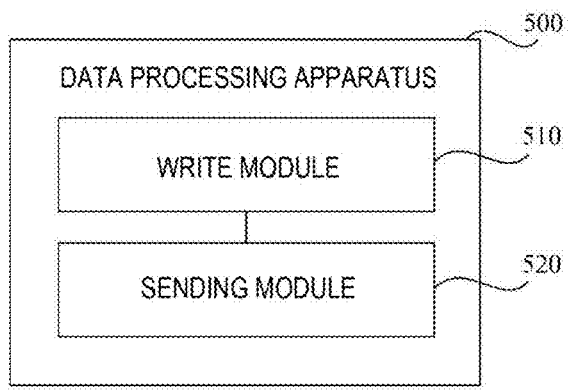
FIG. 5 is a schematic diagram of module connections of a data processing apparatus provided according to an example embodiment.

FIG. 5 is a schematic diagram of module connections of a data processing apparatus according to an example embodiment. As shown in FIG. 5, an embodiment of the present disclosure provides a data processing apparatus. The apparatus 500 is implemented at a computing device. A virtual machine is executed at the computing device. The apparatus 500 may include:

a write module 510, configured to, in response to a target virtual device receiving a data read/write request, write, into a shared memory, target data comprised in the data read/write request, the target virtual device being a virtual device in the virtual machine;

a sending module 520, configured to send an interrupt instruction to a target physical processor in the computing device through a pass-through register corresponding to the target virtual device, the interrupt instruction being used by the target physical processor to acquire the target data from the shared memory according to the interrupt instruction, and inform, according to the target data, a corresponding back-end service program to process the data read/write request.

Optionally, the shared memory includes a physical processor identifier, and the apparatus 500 includes:

a physical processor identifier acquiring module, configured to acquire the physical processor identifier from the shared memory;

a target physical processor determination module, configured to determine the target physical processor based on the physical processor identifier.

Optionally, the shared memory includes a content item for recording the target data, and the write module 510 includes:

a null item determination submodule, configured to determining null items in the shared memory, a null item being a content item with a null parameter value in the shared memory; a write submodule, configured to write the target data into any one of the null items.

Optionally, the target data includes a read/write address, an address length, and device queue information.

Optionally, the pass-through register is obtained by configuring an interrupt command register of a local advanced programmable interrupt controller to a pass-through mode in a process of creating the virtual machine.

Optionally, the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

Optionally, the interrupt instruction is further used by the target physical processor to delete the target data from the shared memory according to the interrupt instruction after processing the data read/write request.

A specific implementation of each functional module of the apparatus in the foregoing embodiment has been described in detail in a method part, and is not repeatedly described herein.

Figure 6:
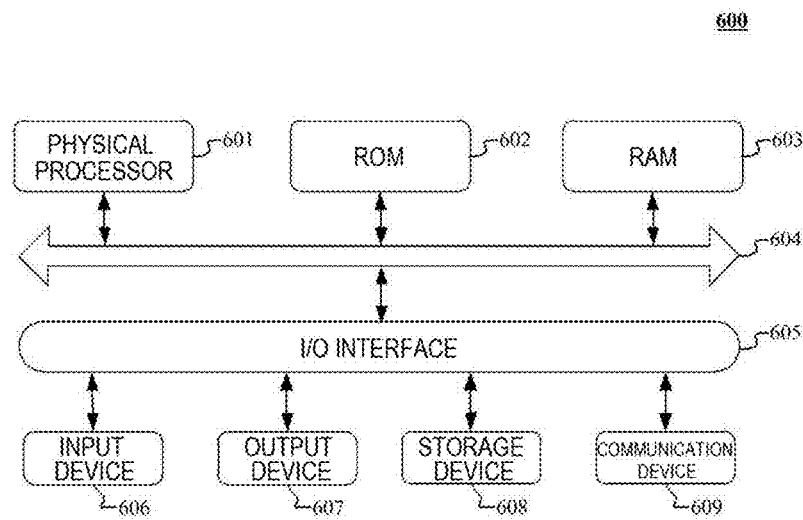
FIG. 6 is a schematic structural diagram of a computing device provided according to an example embodiment.

Reference is now made to FIG. 6, which illustrates a block diagram of a computing device 600 suitable for use in implementing embodiments of the present disclosure. The terminal apparatus in the embodiments of the present disclosure may include, but is not limited to, a mobile terminal such as a mobile phone, a notebook computer, a PDA (Personal Digital Assistant), a PAD (tablet computer), a vehicle-mounted terminal such as a vehicle-mounted navigation terminal, and the like, and a fixed terminal such as a digital TV, a desktop computer, and the like. The computing device illustrated in FIG. 6 is merely one example and should not impose any limitation on the scope of functionality and use of embodiments of the present disclosure.

As shown in FIG. 6, computing device 600 may include at least one physical processor 601 that may perform any of a variety of suitable actions and processes depending on a program stored in read only memory (ROM) 602 or a program loaded from memory 608 into random access memory (RAM) 603. A variety of programs and data necessary for the operation of the computing device 600 are also stored in the RAM 603. The physical processor 601, the ROM 602, and the RAM 603 are connected to each other via a bus 604. An input/output (I/O) interface 605 is also connected to the bus 604.

In general, the following devices may be connected to the I/O interface 605: input devices 606 including, for example, touch screens, touch pads, keyboards, mice, cameras, microphones, accelerometers, gyroscopes, etc.; an output device 607 including, for example, a liquid crystal display (LCD), a speaker, a vibrator, or the like; a memory 608 including, for example, a magnetic tape, a hard disk, or the like; and a communication device 609. Communication device 609 may allow computing device 600 to communicate wirelessly or wired with other devices to exchange data. While FIG. 6 illustrates a computing device 600 having a variety of means, it is to be understood that not all of the illustrated means are required to be implemented or provided. More or fewer devices may alternatively be implemented or provided.

In particular, the processes described above with reference to the flowcharts can be implemented as computer software programs in accordance with embodiments of the present disclosure. For example, embodiments of the disclosure include a computer program product comprising a computer program carried on a non-transitory computer-readable medium, the computer program comprising program code for performing the method as shown in the flowchart. In such an embodiment, the computer program may be downloaded and installed from the network via the communication device 609, or installed from the memory 608, or installed from the ROM 602. When the computer program is executed by the physical processor 601, the described functions defined in the method of embodiments of the present disclosure are executed.

It should be noted that the computer readable medium in the present disclosure may be a computer readable signal medium or a computer readable storage medium, or any combination thereof. A computer-readable medium may be, for example, but not limited to, an electronic, magnetic, optical, electromagnetic, infrared, or semiconductor system, apparatus, or device, or any suitable combination of the foregoing. More specific examples of the computer readable medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may also be any computer readable medium that is not a computer readable medium and that can communicate, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

In some embodiments, a computing device can communicate using any currently known or future developed network protocol, such as the Hypertext Transfer Brief of the case (HTTP), and can be interconnected with digital data communication (e. g., a communication network) in any form or medium. Examples of communication networks include a local area network ("LAN"), a wide area network ("WAN"), an internetwork (e. g., the Internet), and a peer-to-peer network (e. g., an ad hoc peer-to-peer network), as well as any currently known or future developed network.

The computer readable medium may be included in the computing device, or may exist separately and not be installed in the computing device.

The computer readable medium bears one or more programs. When the one or more programs are executed by the computing device, the computing device is enabled to: obtain a current process priority of a host application; adjusting a process priority of a target process of a host application corresponding to the host application to be consistent with the current process priority, wherein the target process creates, for the host application, a process necessary for running a virtual running environment of the host application; A dependency relationship exists between the process priority of the host application and the process priority of the target process, and the dependency relationship is used to enable the process priority of the target process to change following a change in the process priority of the host application.

Computer program code for carrying out operations for aspects of the present disclosure may be written in any combination of one or more programming languages, including, but not limited to, an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules involved in the embodiments of the present disclosure may be implemented by software or by hardware. The name of a module does not constitute a limitation to the module itself in a certain case.

The functions described herein above may be performed, at least in part, by one or more hardware logic components. For example, without limitation, example types of hardware logic components that can be used include Field-programmable Gate Arrays (FPGAs), Program-specific Integrated Circuits (ASICs), Program-specific Standard Products (AS-SPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable media would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

According to one or more embodiments of the present disclosure, example 1 provides a data processing method implemented at a computing device, and a virtual machine is executed in the computing device. The method comprises:
  in response to a target virtual device receiving a data read/write request, writing, into a shared memory, target data comprised in the data read/write request, the target virtual device being a virtual device in the virtual machine;
  sending an interrupt instruction to a target physical processor in the computing device through a pass-through register corresponding to the target virtual device, the interrupt instruction being used by the target physical processor to acquire the target data from the shared memory according to the interrupt instruction, and inform, based on the target data, a corresponding back-end service program to process the data read/write request.

According to one or more embodiments of the present disclosure, example 2 provides the method of example 1, wherein the shared memory comprises a physical processor identifier, and the method further comprises:
  acquiring the physical processor identifier from the shared memory; determining the target physical processor based on the physical processor identifier.

According to one or more embodiments of the present disclosure, example 3 provides the method of example 1 or 2, the shared memory comprises a content item for recording the target data, and writing, into the shared memory, target data comprised in the data read/write request comprises:
  determining null items in the shared memory, a null item being a content item with a null parameter value in the shared memory;
  writing the target data into any one of the null items.

According to one or more embodiments of the disclosure, example 4 provides the method of any of examples 1 to 3, the target data comprises a read/write address, an address length, and device queue information.

According to one or more embodiments of the present disclosure, example 5 provides the method of any of examples 1 to 4, wherein the pass-through register is obtained by configuring an interrupt command register of a local advanced programmable interrupt controller to a pass-through mode in a process of creating the virtual machine.

According to one or more embodiments of the present disclosure, example 6 provides the method of any of examples 1 to 5, the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

According to one or more embodiments of the present disclosure, example 7 provides the method of any of examples 1 to 6, wherein the interrupt instruction is further used by the target physical processor to delete the target data from the shared memory according to the interrupt instruction after processing the data read/write request.

According to one or more embodiments of the disclosure, example 8 provides a data processing apparatus implemented at a computing device, and a virtual machine is executed at the computing device. The apparatus comprises:
  a write module configured to, in response to a target virtual device receiving a data read/write request, write, into a shared memory, target data comprised in the data read/write request, the target virtual device being a virtual device in the virtual machine;
  a sending module configured to send an interrupt instruction to a target physical processor in the computing device through a pass-through register corresponding to the target virtual device, the interrupt instruction being used by the target physical processor to acquire the target data from the shared memory according to the interrupt instruction, and inform, according to the target data, a corresponding back-end service program to process the data read/write request.

According to one or more embodiments of the disclosure, example 9 provides the apparatus of example 8, the shared memory comprises a physical processor identifier, the apparatus comprises:
  a physical processor identifier acquiring module, configured to acquire the physical processor identifier from the shared memory;
  a target physical processor determination module, configured to determine the target physical processor based on the physical processor identifier.

According to one or more embodiments of the present disclosure, example 10 provides the apparatus of example 8 or 9, wherein the shared memory comprises a content item for recording the target data, and the write module comprises:
  a null item determination submodule, configured to determining null items in the shared memory, a null item being a content item with a null parameter value in the shared memory;
  a write submodule, configured to write the target data into any one of the null items.

According to one or more embodiments of the present disclosure, example 11 provides the apparatus of any of examples 8 to 10, wherein the target data includes a read/write address, an address length, and device queue information.

According to one or more embodiments of the present disclosure, example 12 provides the apparatus of any of examples 8 to 11, the pass-through register is obtained by configuring an interrupt command register of a local advanced programmable interrupt controller to a pass-through mode in a process of creating the virtual machine.

According to one or more embodiments of the present disclosure, example 13 provides the apparatus of any of examples 8 to 12, the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

According to one or more embodiments of the present disclosure, example 14 provides the apparatus of any of examples 8 to 13, wherein the interrupt instruction is further used by the target physical processor to delete the target data from the shared memory according to the interrupt instruction after processing the data read/write request.

According to one or more embodiments of the present disclosure, example 15 provides having a computer program stored thereon, the computer program being executed by at least one physical processor to run a virtual machine and enable the virtual machine to implement steps of the method according to any of examples 1 to 7.

According to one or more embodiments of the present disclosure, example 16 provides a computing device, comprising:
  a memory device having at least one computer program stored thereon;
  at least one physical processor configured to execute the at least one computer program in the memory to run a virtual machine and enable the virtual machine to implement steps of the method according to any of examples 1 to 7.

According to one or more embodiments of the disclosure, example 17 provides a computer program product having program code stored thereon, instructions comprised in the program codes, when executed by at least one physical processor to run a virtual machine, and enable the virtual machine to implementing steps of the method according to any of examples 1 to 7.

According to one or more embodiments of the present disclosure, example 18 provides being executed by at least one physical processor to run a virtual machine and enable the virtual machine to implement steps of the method according to any of examples 1 to 7.

According to the data processing method provided in the present application, in response to receiving a data read/write request, a target virtual device first write, into a shared memory, target data comprised in the data read/write request, the target virtual device being a virtual device in the virtual machine; then sends an interrupt instruction to a target physical processor in the computing device through a pass-through register corresponding to the target virtual device, to enable the target physical processor to acquire the target data from the shared memory according to the interrupt instruction, and informs, based on the target data, a corresponding back-end service program to process the data read/write request. The original manner of the virtual device writing the device configuration space is changed to sending an interrupt to the physical processor, so that the virtual machine does not need to exit the host mode when performing a inform, thereby reducing the IM Exit generated in the process of the virtual device writing the device configuration space, reducing a delay of processing a data read/write request, and improving the processing performance of the virtual device.

The foregoing description is merely illustrative of the preferred embodiments of the present disclosure and of the technical principles applied thereto, as will be appreciated by those skilled in the art, The disclosure of the present disclosure is not limited to the technical solution formed by the specific combination of the described technical features, At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment.

Conversely, various features that are described in the context of a single embodiment can also be implemented in a plurality of embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims. With respect to the apparatus in the foregoing embodiments, the specific manner in which the modules execute the operations has been described in detail in the embodiments of the method, and is not described in detail herein.

What is claimed is:

1. A data processing method implemented at a computing device, wherein a virtual machine is executed in the computing device, the method comprising:

in response to a target virtual device receiving a data read/write request, writing directly, by the target virtual device, into a shared memory, target data comprised in the data read/write request, the target virtual device being a virtual device in the virtual machine and the shared memory configured to store the target data from the target virtual device and facilitate direct communication between the target virtual device and a target physical processor through the shared memory; and sending, by the target virtual device, an interrupt instruction to the target physical processor in the computing device through a pass-through register configured for the target virtual device, wherein the pass-through register is obtained by configuring an interrupt command register of a local advanced programmable interrupt controller to a pass-through mode in a process of creating the virtual machine and is configured to directly route the interrupt instruction to the target physical processor to cause the target physical processor to acquire the target data from the shared memory according to the interrupt instruction without causing the virtual machine to exit to a host mode, enabling the direct communication between the target virtual device and the target physical processor, and inform, based on the target data, a corresponding back-end service program to process the data read/write request.

2. The data processing method of claim 1, wherein the shared memory comprises a physical processor identifier, and the method further comprises:

acquiring the physical processor identifier from the shared memory; and determining the target physical processor based on the physical processor identifier.

3. The data processing method of claim 1, wherein the shared memory comprises a content item for recording the target data, and writing, into the shared memory, target data comprised in the data read/write request comprises:

determining null items in the shared memory, a null item being a content item with a null parameter value in the shared memory; and writing the target data into any one of the null items.

4. The data processing method of claim 1, wherein the target data comprises a read/write address, an address length, and device queue information.

5. The data processing method of claim 1, wherein the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

6. The data processing method of claim 1, wherein the interrupt instruction is further used by the target physical processor to delete the target data from the shared memory according to the interrupt instruction after processing the data read/write request.

7. A non-transitory computer readable storage medium having a computer program stored thereon, the computer program being executed by at least one physical processor to run a virtual machine and enable the virtual machine to implement acts comprising:

in response to a target virtual device receiving a data read/write request, writing directly, by the target virtual device, into a shared memory, target data comprised in the data read/write request, the target virtual device being a virtual device in the virtual machine and the shared memory configured to store data from the target virtual device and facilitate direct communication between the target virtual device and a target physical processor through the shared memory; and sending, by the target virtual device, an interrupt instruction to the target physical processor in the computing device through a pass-through register configured for the target virtual device, wherein the pass-through register is obtained by configuring an interrupt command register of a local advanced programmable interrupt controller to a pass-through mode in a process of creating the virtual machine and is configured to directly route the interrupt instruction to the target physical processor to cause the target physical processor to acquire the target data from the shared memory according to the interrupt instruction without causing the virtual machine to exit to a host mode, enabling the direct communication between the target virtual device and the target physical processor, and inform, based on the target data, a corresponding back-end service program to process the data read/write request.

8. The non-transitory computer readable storage medium of claim 7, wherein the shared memory comprises a physical processor identifier, and the acts further comprise:

acquiring the physical processor identifier from the shared memory; and determining the target physical processor based on the physical processor identifier.

9. The non-transitory computer readable storage medium of claim 7, wherein the shared memory comprises a content item for recording the target data, and writing, into the shared memory, target data comprised in the data read/write request comprises:
- determining null items in the shared memory, a null item being a content item with a null parameter value in the shared memory; and
- writing the target data into any one of the null items.

10. The non-transitory computer readable storage medium of claim 7, wherein the target data comprises a read/write address, an address length, and device queue information.

11. The non-transitory computer readable storage medium of claim 7, wherein the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

12. The non-transitory computer readable storage medium of claim 7, wherein the interrupt instruction is further used by the target physical processor to delete the target data from the shared memory according to the interrupt instruction after processing the data read/write request.

13. A computing device, comprising:
- a memory having at least one computer program stored thereon;
- at least one physical processor configured to execute the at least one computer program in the memory to run a virtual machine and enable the virtual machine to implement acts comprising:
- in response to a target virtual device receiving a data read/write request, writing directly, by the target virtual device, into a shared memory, target data comprised in the data read/write request, the target virtual device being a virtual device in the virtual machine and the shared memory configured to store data from the target virtual device and facilitate direct communication between the target virtual device and a target physical processor through the shared memory; and
- sending, by the target virtual device, an interrupt instruction to the target physical processor in the computing device through a pass-through register configured for the target virtual device, wherein the pass-through register is obtained by configuring an interrupt command register of a local advanced programmable interrupt controller to a pass-through mode in a process of creating the virtual machine and is configured to directly route the interrupt instruction to the target physical processor to cause the target physical processor to acquire the target data from the shared memory according to the interrupt instruction without causing the virtual machine to exit to a host mode, enabling the direct communication between the target virtual device and the target physical processor, and inform, based on the target data, a corresponding back-end service program to process the data read/write request.

14. The computing device of claim 13, wherein the shared memory comprises a physical processor identifier, and the acts further comprise:
- acquiring the physical processor identifier from the shared memory; and
- determining the target physical processor based on the physical processor identifier.

15. The computing device of claim 13, wherein the shared memory comprises a content item for recording the target data, and writing, into the shared memory, target data comprised in the data read/write request comprises:
- determining null items in the shared memory, a null item being a content item with a null parameter value in the shared memory; and
- writing the target data into any one of the null items.

16. The computing device of claim 13, wherein the target data comprises a read/write address, an address length, and device queue information.

17. The computing device of claim 13, wherein the interrupt instruction is further used by the target physical processor to acquire the target data from the shared memory according to the interrupt instruction, determine a target physical device according to the target data and a predetermined index table, and inform a back-end service program corresponding to the target physical device to process the data read/write request.

* * * * *